United States Patent [19]

Fox

[11] Patent Number: 5,524,548

[45] Date of Patent: Jun. 11, 1996

[54] FESTOON BRAKE SYSTEM

[76] Inventor: Richard D. Fox, 1225 Limerick Dr., Placentia, Calif. 92670

[21] Appl. No.: 386,298

[22] Filed: Feb. 9, 1995

[51] Int. Cl.⁶ .............................. B61B 3/00; B61H 7/00; H02G 11/00

[52] U.S. Cl. .............................. 104/89; 104/249; 104/95; 188/42; 212/329; 191/12 R

[58] Field of Search .............................. 188/42, 43, 44, 188/61, 168; 104/72.4, 89, 94, 249, 95; 212/316, 329, 331, 346; 191/12 R, 12.2 A

[56] References Cited

U.S. PATENT DOCUMENTS

| | | | |
|---|---|---|---|
| 2,893,518 | 7/1959 | Vanderbeck | 188/42 |
| 3,200,768 | 8/1965 | Harrison | 188/42 X |
| 3,397,650 | 10/1968 | Kondur et al. | 104/249 X |
| 3,696,890 | 10/1972 | Armstrong | 104/249 X |
| 3,705,554 | 12/1972 | Aksamit | 104/250 |
| 3,722,705 | 3/1973 | Gould | 212/15 |
| 3,759,189 | 9/1973 | Desilets | 104/172.4 |
| 3,986,458 | 10/1976 | Kling | 104/172.4 |
| 4,326,466 | 4/1982 | Parry et al. | 104/172.4 |
| 4,576,096 | 3/1986 | Toder | 188/42 X |
| 4,898,099 | 2/1990 | Summa | 104/172.4 |
| 5,320,211 | 6/1994 | Sigiura | 198/685 |

FOREIGN PATENT DOCUMENTS

| | | | |
|---|---|---|---|
| 903456 | 10/1945 | France | 188/24.14 |
| 1266675 | 6/1961 | France | 191/12 R |
| 2206309 | 8/1973 | Germany | 191/12 R |
| 1016521 | 1/1966 | United Kingdom | 104/94 |

Primary Examiner—Robet J. Oserleitner
Assistant Examiner—Kevin D. Rutherford
Attorney, Agent, or Firm—Walter A. Hackler; Linda A. Fox

[57] ABSTRACT

A trolley system is provided which includes a powered tow trolley that travels along a rail, an end trolley that is fixed to an end of the rail, and several intermediate trolleys that travel along the rail between the tow and end trolleys. All trolleys are interconnected with a flexible tow line. Each intermediate trolley is provided with an individual mechanical brake for preventing movement along the rail until the brake is actively released by either a pulling or pushing force exerted on the corresponding trolley. The trolleys may include saddles for supporting for example, a load of cables or hoses festooned between the trolleys that are used for powering a moving machine connected to the tow trolley.

29 Claims, 3 Drawing Sheets

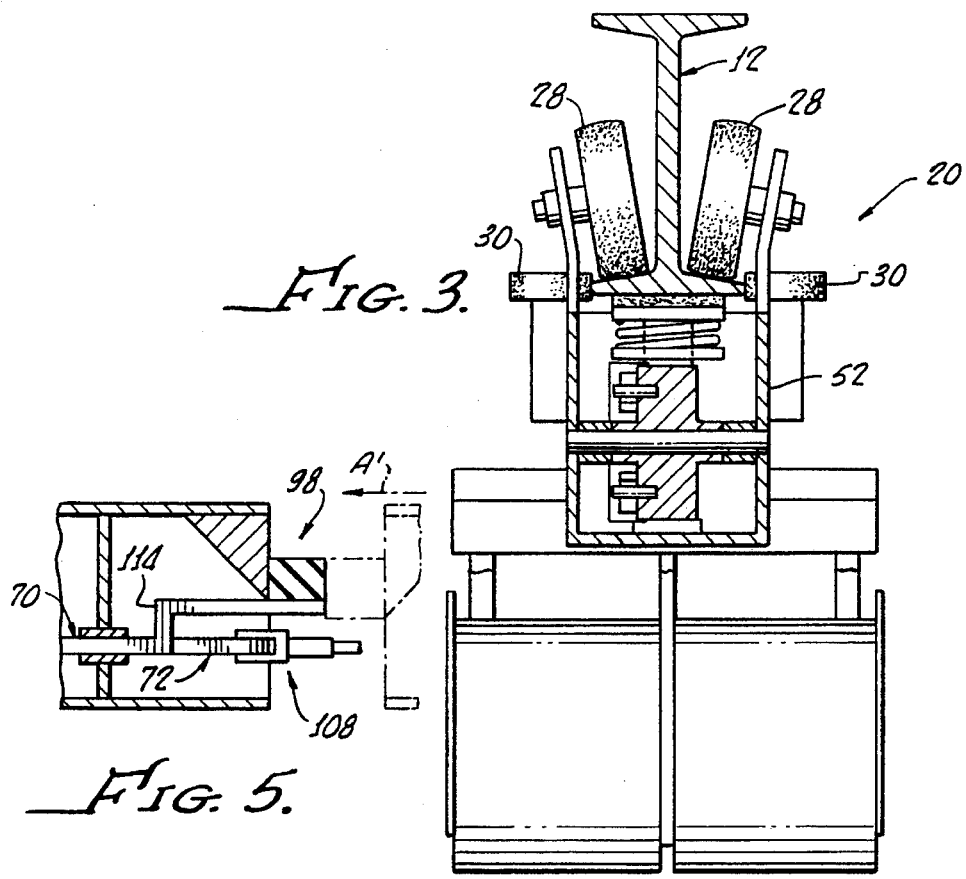
FIG. 3.
FIG. 5.
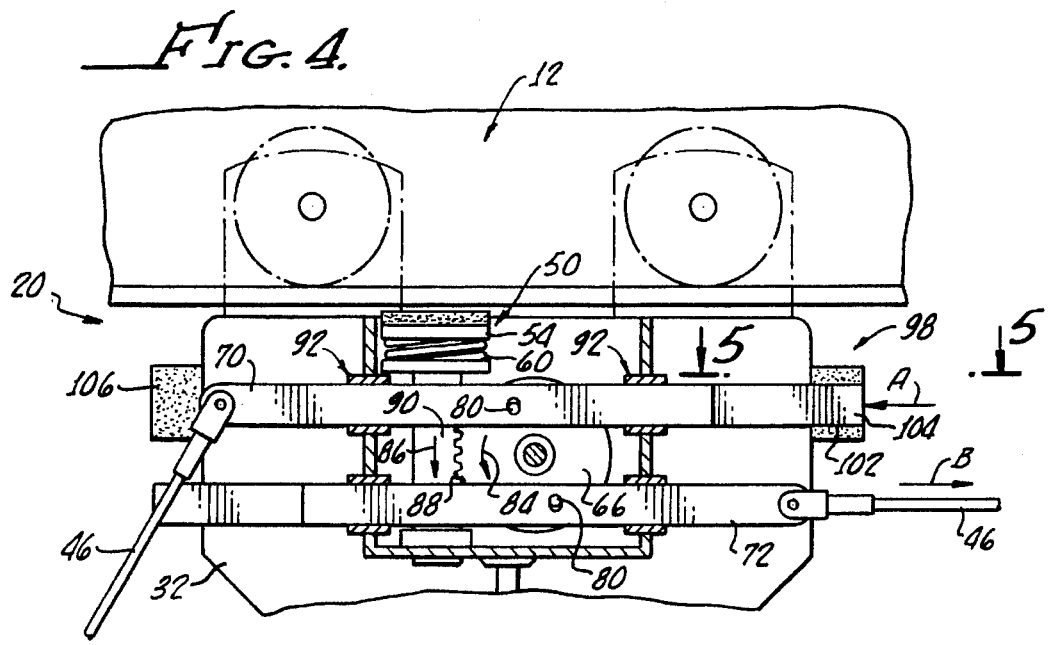
FIG. 4.

FESTOON BRAKE SYSTEM

The present invention generally relates to a trolley system, and particularly to a braking system for trolleys that travel along a beam and carry, for example, loops of electrical cables used for powering a movable machine.

Trolley systems that include multiple trolleys that travel along a rail, beam or track have been used extensively in industry. For example, an assembly line for the production of automobiles may utilize such a system for moving a car body through various stages of production.

A relatively recent application of trolley systems involves facilitating the carrying and organization of cables suspended and between trolleys. Such cables may be hydraulic hoses or electrical cables which are used to provide power and control to a moving machine that is distant from a power source. For example, a gantry crane may include a moving hoist that typically requires substantial electrification for its operation. In order to supply power and control to such a hoist, electrical cables are used which run from a power source to the hoist. Through the use of a trolley system, such cables can be suspended in loops, or more accurately festoons, between adjacent trolleys riding along an elevated beam. By use of such a system, multiple cables and hoses are kept in an orderly fashion and suspended away from potentially damaging equipment.

Such a trolley system usually includes a horizontal rail upon which are mounted several trolleys. The trolleys may be informally categorized as follows. First, there is a fixed trolley, or an end clamp, positioned adjacent to the power source. Second, there is a tow trolley that is movable in conjunction with the machine being powered. Third, in between the end clamp and the tow trolley, there are several intermediate trolleys that move in response to the pulling action of the tow trolley. In this type of system, all of the trolleys are connected to one another by flexible tow lines running between each of the trolleys. Cables and hoses are carried by and are festooned between the trolleys, beginning at the power source and terminating at the moving machine. The intermediate trolleys are freely movable within the scope of the limiting connecting lines.

When the moving machine is in operation, the motion of the trolleys may be described briefly as follows. The intermediate trolleys are able to travel in two directions along a single axis, the axis being defined by the rail upon which they are connected. These intermediate trolleys are prompted into motion along the rail initially by the moving tow trolley. The moving tow trolley may move in two directions as well.

First, the tow trolley may pull on a tow line connecting an adjacent intermediate trolley. Said intermediate trolley will react to the pulling force by traveling toward the tow trolley. Consequently, said intermediate trolley will abruptly pull the next adjacent intermediate trolley forward as well. The reaction will continue until the last intermediate trolley attempts to pull the end clamp. Conversely, when the tow trolley stops abruptly, the inertia of the "free wheeling" trolleys causes the first trolley to crash into the tow trolley and rebound. The first trolley is then driven into the tow trolley again by the impact with the second trolley which is struck by the third trolley, and so forth. The resulting reaction initiated by the tow trolley becomes a complicated reaction of multiple oscillations and collisions between the trolleys. The chain reaction of impacts and rebounds may continue even after the tow trolley has ceased moving.

The trolleys in such systems are often considerably massive in weight. Furthermore, the tow trolley typically travels at a rapid pace, back and forth, along the beam. Thus, the collisions between the trolleys may be quite forceful and violent. Consequently, the trolleys are often made to be even stronger and more rugged than they would otherwise need be, primarily due to the damaging effects resulting from impacts. Notably, these trolleys may travel at speeds of up to 600 feet per minute before colliding with one another.

Cargo handling cranes are commonly erected in areas of high winds and damp sea air. The strength of coastal winds often causes the freely moving trolleys to travel idly along the rail, contributing to the number of impacts and thus wearing the trolleys even further. Notably, the loads carried by the trolleys are often damaged from impacts as well. Freely colliding trolleys cause excessive abrasion of the surfaces of hoses and cables commonly linked therebetween.

Another type of trolley system that experiences similar problems to those described above is a monorail system that employs suspended trolleys for material handling, for example, a coal hauling operation. While many such systems utilize a continuous circular track on which all trolleys are towed in one direction by a tow trolley, many monorail systems include trolleys which travel in two opposite directions upon a rail. It should be appreciated that problems may be greatly increased with trolley systems having a tow trolley pulling free rolling intermediate trolleys up and down an inclined rail.

Conventionally, rubber bumpers are installed on both ends of a each intermediate trolley as a means to diminish the strength of impact between trolleys. Unfortunately, rubber bumpers are not typically effective in preventing damage to trolleys and tend to contribute to the rebounding effect of impacts.

Additionally, "shock cords" are frequently utilized in attempts to dampen the motion of the freely moving trolleys. A shock cord is typically an elastic member which absorbs the pulling force exerted by one trolley upon an adjacent trolley. Thus, the force of sudden acceleration between trolleys will be lessened, and consequently the impact force between trolleys is reduced. Unfortunately, the effectiveness of shock cords is limited.

Despite efforts to diminish the force of impacts upon trolleys, they require frequent maintenance and repair. If a single trolley becomes damaged to a point where it can no longer travel along the rail effectively, the entire trolley system may be forced to a standstill. Again, using the example of the hoist used to lift containers at a port, there are usually only a selected number of overhead cranes erected at a port that are available for operation. Indeed, a single crane may be a company's only crane, and thus even a temporary shutdown of the crane for unexpected repairs can cause a huge financial setback.

The present invention is directed to overcome the problems described above. It would be advantageous to have a device for reducing the force of impacts between trolleys and preventing idle motion of the trolleys while preserving the efficiency of the system. The present invention can be used to reduce the frequency of repairs and increase safety for the operators that use such systems.

SUMMARY OF THE INVENTION

A trolley brake system, in accordance with the present invention generally includes a rail, or alternatively a beam or a track, which is to be considered equivalent, a tow trolley movably attached to an end of the rail, an end trolley fixed to another end of the rail, and a plurality of intermediate trolleys disposed between the tow trolley and end trolley. The tow trolley may be movably attached to the rail by means of a powered tow bar, in which case, the tow trolley is, in the industry, referred to as a tow clamp. Alternatively, the tow trolley may be directly connected to the rail and may travel along the rail in response to an independent moving machine.

More particularly, each intermediate trolley is movably attached to the rail, and each of the trolleys are linked together by a tow line which provides means for causing the tow trolley to move the intermediate trolleys apart from one another as the tow trolley moves away from the end trolley. Each trolley includes means for supporting a load. For example, a saddle may be suspended from each trolley and may be designed to support one or more cables festooned between adjacent trolleys.

Importantly, a brake, disposed on each of the intermediate trolleys, provides means for preventing movement of each intermediate trolley along the rail until the trolley is subjected to a sufficient pushing or impact force. More particularly, and as will be discussed in greater detail hereinafter, the trolley system includes means for releasing each individual brake by pulling action of the tow line and further, means for releasing each individual brake upon impact between adjacent trolleys.

Preferably, each individual brake includes a brake shoe that is operatively disposed for engagement with the rail. Each brake further includes a spring, or other bias means, for urging the brake shoe into engagement with the rail. Thus, in effect, each intermediate trolley is anchored to the rail by its corresponding brake until the brake is released by either a pulling action of the tow line, or by a pushing force caused by impact with an adjacent trolley. The trolley brake system, as just described, effectively minimizes the force of impacts between trolleys, prevents idle motion of individual trolleys and reduces the frequency of repairs required to keep the trolley system functionable.

Preferably, the means for releasing an individual brake comprises a member mounted about an axis on a corresponding intermediate trolley, and first and second arms for causing the member to move in response to a sufficient pushing or pulling force. A sufficient degree of axial motion of the member will disengage the brake shoe from the rail.

More particularly, the first and second arms are pivotally mounted to the member and each is connected to the tow line. A sufficient pulling force on the tow line will thus cause the member to pivot and consequently, drive the brake shoe out of engagement with the rail. The brake will remain disengaged until the tow line no longer pulls on the trolley, at which time the brake shoe will once again engage with the rail.

Importantly, each trolley also includes means for releasing the brake upon impact between said trolley and an adjacent trolley. Preferably, a bumper end on the first arm may cause the member to move in response to a pushing force exerted by an adjacent trolley, and consequently, the brake shoe will be disengaged from the rail until the bumper end is no longer being pushed.

In one embodiment of the present invention, the means for biasing the brake into engagement with the rail comprises a coiled spring depending from the brake shoe. A toothed perimeter of said member and an cooperating toothed length of the brake shoe provide means for driving the brake shoe away from the rail in response to axial motion of the member.

Another embodiment of the present invention includes a leaf spring for biasing the brake shoe, and a cam surface on the member for depressing the spring in response to axial motion of the member. Other means for biasing the brake shoe may also be provided.

BRIEF DESCRIPTION OF THE DRAWINGS

The advantages and features of the present invention may be more clearly understood with reference to the following description when considered in conjunction with the accompanying drawings in which:

FIG. 3 shows a sectional view the trolley of FIG. 2 taken along the line 3—3;

FIG. 4 shows the trolley shown in FIG. 2 with the braking mechanism disengaged.

FIG. 5 shows a cross sectional view of the trolley brake shown in FIG. 4 taken along the line 5—5, including a bumper release mechanism offset from a tow line connection;

DETAILED DESCRIPTION

Figure 1:
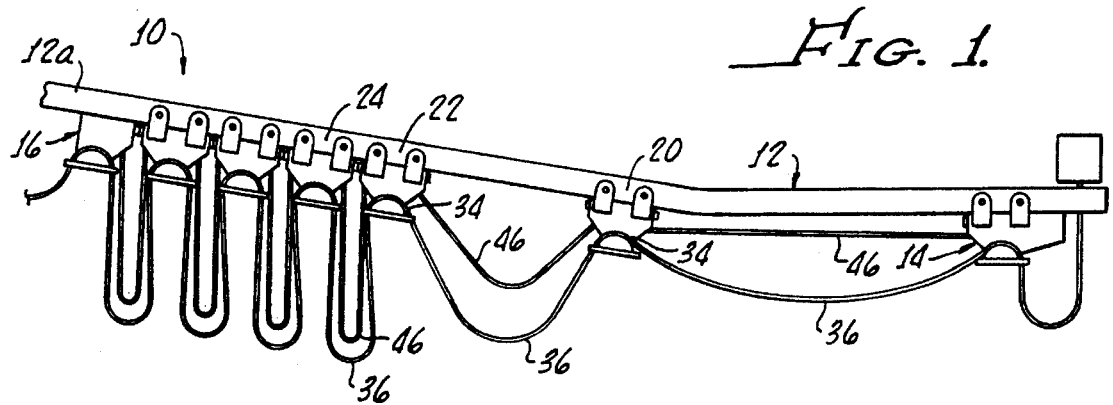
FIG. 1 shows a trolley brake system, including a tow trolley and several trolleys movably attached to a rail which may be substantially horizontal or inclined.

Turning now to FIG. 1, a trolley brake system 10 in accordance with the present invention generally includes a beam or rail 12, a tow trolley 14 that is attached to the rail 12 for movement therealong, and an end trolley 16 which is fixed at one end 12a of the rail 12. The end trolley 16 may also be referred to as an end clamp, because it can be any fixed member that defines the end of the length of rail 12 upon which the trolleys may travel. A plurality of intermediate trolleys 20, 22, 24 are movably attached to the rail 12 between the tow 14 and end trolley 16.

Figure 2:
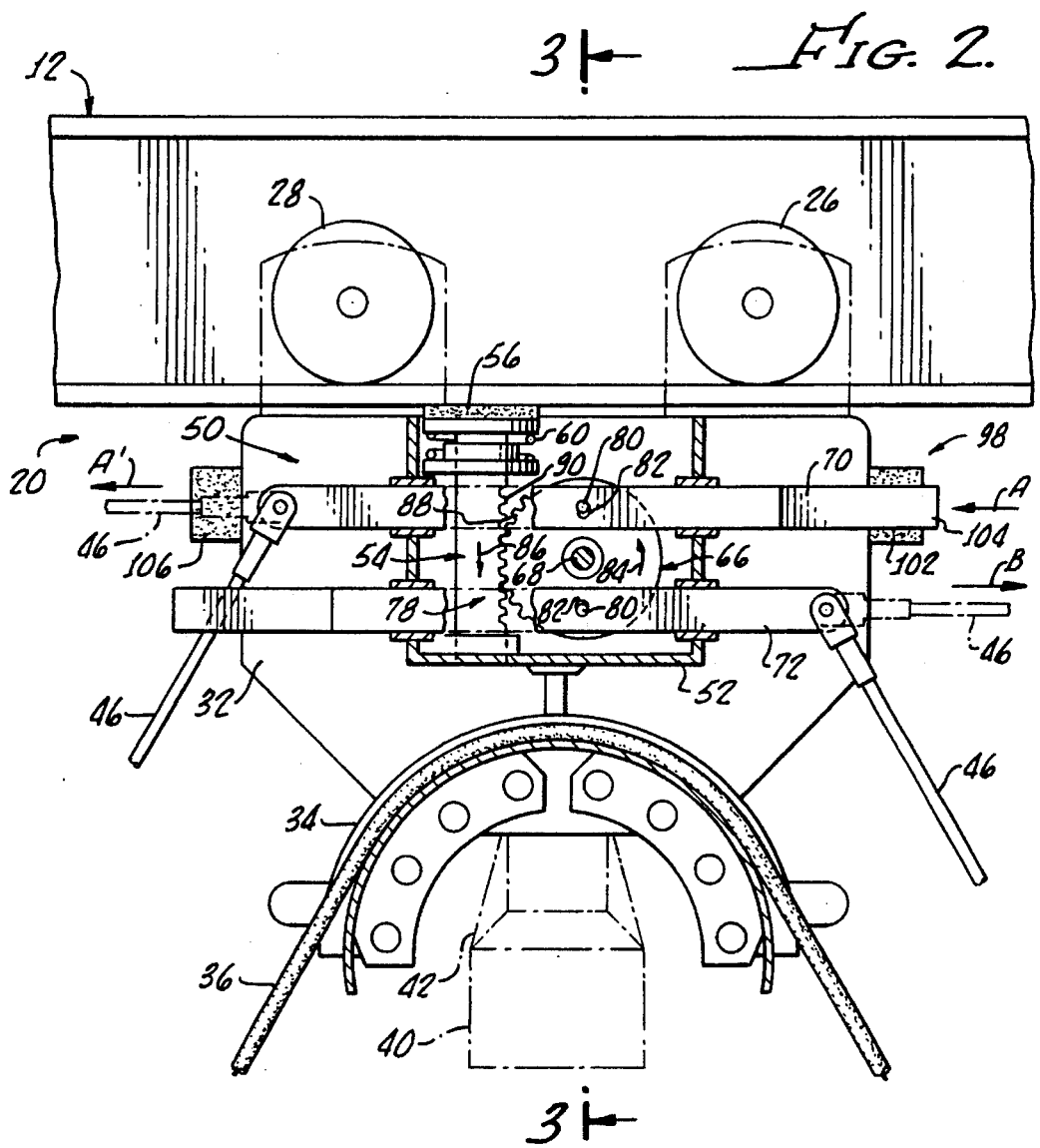
FIG. 2 shows a side view of an individual intermediate trolley as shown in FIG. 1 including a brake biased into engagement with the rail.

FIG. 2 shows a single intermediate trolley 20, movably attached to the rail 12 in a conventional manner, by pairs of wheels 26, 28. Turning briefly to FIG. 3, a cross-sectional view of the intermediate trolley 20 and the rail 12 is shown. The rail 12, in this example, is a conventional "I-beam". It should be appreciated that the present invention 10 may utilize a rail 12, beam or track which are all considered to be equivalent. A pair of wheels 28 straddling the lower horizontal ledge of the I-beam, provide the means for movably attaching the trolley to the rail 12. Guide rollers 30 may be provided in order to assist in maintaining the position of the trolley along the rail 12.

Referring now to FIGS. 1 and 2, each intermediate trolley 20 generally includes a carrier body 32 and a saddle 34 which provides means for supporting a load suspended therefrom. FIG. 1 shows an embodiment 10 of the present invention in which the saddle 34 is suspended from each intermediate trolley 20, 22, 24 and designed to support a load of at least one cable 36, hose or the like. The supported cable 36, having a length greater than a length of the rail 12, is festooned between the tow trolley 14, intermediate trolleys 20, 22, 24 and end trolley 16. This type of trolley system may be used to organize cables and hoses 36 that carry power from a source (not shown) located adjacent the end trolley 16 to a movable machine (not shown) located adjacent the tow trolley 14. Alternatively, as shown in phantom line, a load (not shown) may be supported by a container 40 suspended from the carrier body 32 by cables 42 or other supports.

A tow line 46 interconnected between each of the trolleys, may provide means for causing the tow trolley 14 to pull the intermediate trolleys 20, 22, 24 apart from one another as the tow trolley 14 moves along the rail 12 in a direction away from the end trolley 16. The tow trolley 14 is a powered control trolley, and it initiates all subsequent trolley motion along the rail 12.

Importantly, a trolley system 10 in accordance with the present invention includes an individual brake 50 disposed on each intermediate trolley 20, 22, 24. FIG. 2 shows an intermediate trolley 20 in which the brake is contained within a brake housing 52 secured to the carrier body 32. The brake housing 52 is shown in cross section in order to reveal the elements of the individual brake 50.

The brake 50 preferably includes a brake shoe 54, operatively disposed for engagement with the rail 12. A brake shoe pad 56, which may be made of any suitable material, is normally pressed against the rail 12 with sufficient force to anchor the trolley 20, such that the trolley 20 does not travel idly along the rail 12. In other words, the brake shoe 54 is biased into engagement with the rail 12 until actively released.

Preferably, a coiled spring 60 provides the means for urging the brake shoe 54 into engagement with the rail 12. Importantly, the brake 50 may be released upon pulling action of the tow line 46 when adjacent trolleys 20, 22, 24 are spaced apart from one another at a distance proximately equal to a length of the tow line 46 extending between the adjacent trolleys.

Accordingly, FIG. 1 represents a point in time in which intermediate trolley 20 is being pulled by the tow trolley 14, thus the intermediate trolley 20 is freely following the tow trolley 14, and is not braked to the rail 12. On the other hand, intermediate trolley 24 has not yet been pulled by intermediate trolley 20, as represented by the slackened tow line 46 between trolley 20 and trolley 24. Thus, intermediate trolley 24 remains braked to the rail 12. Generally, when the tow line portion 46 between trolleys is extended to nearly its full length, due to a tow or intermediate trolley traveling away from an adjacent trolley, the brake 50 will be released.

As will be more thoroughly discussed hereinafter, the present invention further includes means for releasing individual brakes upon impact of adjacent trolleys.

Importantly, because the brake shoe 54 is biased into engagement with the rail 12, the brake 50 is always engaged to the rail 12 while the system is in operation unless the corresponding trolley is being acted upon by a pulling or a pushing force in a direction parallel with the rail 12.

Referring again to FIG. 2, the means for releasing the individual brake 50 may comprise a member 66 mounted for movement about an axis (intersecting the drawing at point 68) on a corresponding intermediate trolley 20. The member 66 may be a flat circular disc, as shown, or any other suitably shaped member having an axis of rotation. The member 66 is preferably pivotally mounted, by any suitable means, to both the carrier body 32 and the brake housing 52. Further included is a pair of arms 70, 72 pivotally mounted to the member 66 for causing the member 66 to move about the axis 68, and means 78 for driving the brake shoe 54 away from the rail 12 in response to motion of the member 66.

More particularly, there may be a first arm 70 pivotally mounted to a top portion of the member 66 and a second arm 72, pivotally mounted to a bottom portion of the member 66. The arms 70, 72 may be pivotally mounted by any conventional method. For example, pins 80, projecting from the member 66 through apertures 82 in the arms 70, 72 provide a suitable means for pivotal mounting. Preferably, the apertures 82 are elongated as shown to compensate for a small vertical displacement of the arm 70, 72 along the face of the member 66 that occurs when the arm 70, 72 is subjected to a pulling or pushing force.

Turning now to both FIGS. 2 and 4, it is shown that a pushing force in the direction of arrow A causes the member 66 to rotate in a counter-clockwise direction (represented by the arrow 84 on the member). Similarly, a pulling force, represented by arrow A', exerted by the tow line 46 also causes the member 66 to rotate in a counter-clockwise direction 84. On the other hand, a pulling force exerted on the second arm 72 in the direction of arrow B, opposite to arrow A, will cause the member 66 to rotate counter-clockwise 84 as well. Sufficient rotation of the member 66 about its axis 68 will cause the brake shoe 54 to disengage the rail 12, as shown in FIG. 4.

Preferably, a toothed perimeter 88 of the member 66 and a complementary toothed length 90 of the brake shoe 54 provide means for driving the brake shoe 54 in a direction away from the rail 12 (see arrow 86) in response to movement of the member 66 (see arrow 84). More particularly, the brake shoe 54 and member 66 have adjacent edges 88, 90 that are geared together, akin to a rack and pinion system.

Sleeves 92, or other holding structures secured to the brake housing 52 may provide means for restricting vertical movement of the arms 70, 72 and thus in effect restrict rotation of the member 66. Thus, if a severe pulling or pushing force is exerted against the first 70 or second arm 72, the member 66 will not respond with excessive rotation which could cause jamming or damage to the brake 50.

Referring to FIG. 4, the present invention is shown to include a first bumper 98 on the first arm 70 which provides means for releasing the brake 50 upon impact therewith. In particular, the first bumper 98 may include a shock absorbent portion 102 extending beyond the carrier body 32 and a projecting end 104 slidably disposed within the shock absorbent portion 102. The projecting end 104 may be connected to the first arm 70 such that when the brake in engaged, the projecting end 104 extends partially outside of the shock absorbent portion 102 as shown in FIG. 2. Each trolley 20 may also include a second bumper 106 mounted to the carrier body at a position such that upon impact between adjacent trolleys, the second bumper 106 on one of the trolleys presses the projecting end 104 on the adjacent trolley. FIG. 4 shows the positioning of the member 66 and brake shoe 54 while the projecting end 104 is being pressed. Particularly, depression of the projecting end 104 will cause the first arm 70 to slide away from the point of impact, rotating the member 66 sufficiently to cause the brake shoe 54 to disengage the rail 12.

FIGS. 2 and 4 further illustrate the action of the brake system when the brake shoe 54 is caused to disengage the rail 12 in response to a pulling force exerted on the tow line 46 by an adjacent trolley. Shown are tow lines 46 linked to both the first and second arms 70, 72. A sufficient pulling force exerted on either of these tow lines 46 will cause the member 66 to rotate counter-clockwise and thus disengage the brake 50.

FIG. 5 shows the positional relationship between the first bumper 98 of the first arm 70, and the tow line end 108 of the second arm 72. The first bumper 98 is preferably offset a sufficient distance from a plane defined by the first and second arm 70, 72 in order to enable proper functioning brake 50. The first bumper 98 may be offset, for example, by a short rod 114 extending perpendicularly with the first arm 70.

Turning back briefly to FIG. 1, the motion of a trolley system 10 in accordance with the present invention may be described as follows. It is shown that each intermediate trolley 20, 22, 24 remains braked to the rail 12 until it is pulled or pushed by an adjacent trolley 14, 20, 22, 24. The result is that in response to the motion of the tow trolley 14 along the beam, the intermediate trolleys 20, 22, 24 experience fewer rebounds and impacts than comparative trolleys of prior art systems.

Consider, for example, the inclined rail 12 as an illustration of intermediate trolley motion in response to a rightward motion of the tow trolley 14. Because the brake on each intermediate trolley is biased into engagement with the rail 12, the clustered trolleys 22, 24, 26 do not roll down the incline. Note that intermediate trolley 20 has been pulled by the tow trolley 14 by way of the tow line 46, which is shown stretched taught between trolley 20 and tow trolley 14. Thus, because trolley 20 is being pulled by the tow trolley 14, its brake is released, and it has moved away from the cluster. Once trolley 20 reaches a point along the rail 12 where it is no longer being pulled by the tow trolley 14, its brake will again engage with the rail 12.

Furthermore, recall that the brake on each trolley will be released upon impact between adjacent trolleys. Assume now that trolley 20 is now braked to the rail. If tow trolley 14 moves toward (leftward) and collides with intermediate trolley 20, the brake on trolley 20 will release, and enable the tow trolley 14 to push the intermediate trolley along the rail 12 smoothly. Once the tow trolley 14 stops or changes direction (travels rightward), trolley 20 will automatically brake to the rail and will not continue traveling left (as would a trolley that was free rolling and not braked to the rail).

Figure 6:
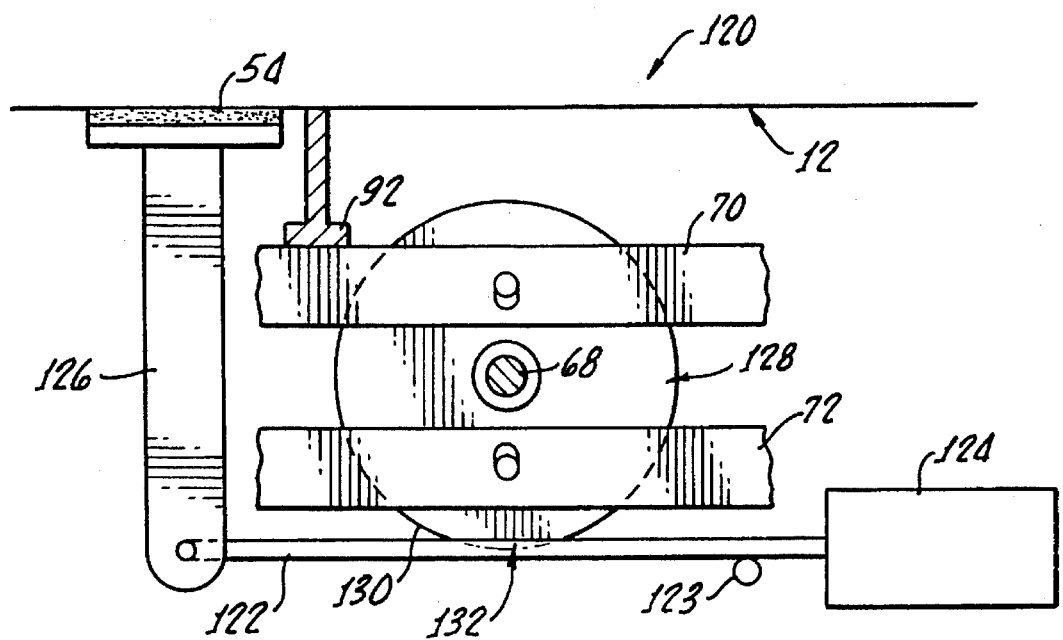
FIG. 6 shows another embodiment of the present invention using a weighted lever as means for biasing the brake into engagement with the rail; and FIG. ;7 shows yet another embodiment of the present invention using a leaf spring as means for biasing the brake into engagement with the rail.

FIG. 6 shows another embodiment 120 of the present invention wherein the bias means comprises a lever 122 with a pivot point 123, including a weighted member 124 on one end of the lever, which provides means for exerting a force on an opposite end of the lever 122. Note that all elements which are identical to the elements of earlier described embodiments are provided with identical numbers. In this embodiment, force of gravity pulling on the mass 124 fixed at one end of the lever 122 provides the force necessary to bias the brake shoe 126 into engagement with the rail 12. A member 128 having a cam surface 130, for example, the circular disc 128 having a flat bottom 132 as shown, may provide the means to overcome the bias in response to a pulling or pushing force on the arms 70, 72. In particular, rotation of the member 128 will cause the cam surface 130 to contact the lever 122, forcing the lever 122 downward and consequently disengaging the brake shoe 126 from the rail 12. Again, the rotation of the member 128 is preferably restricted by sleeves 92 or other means.

Figure 7:
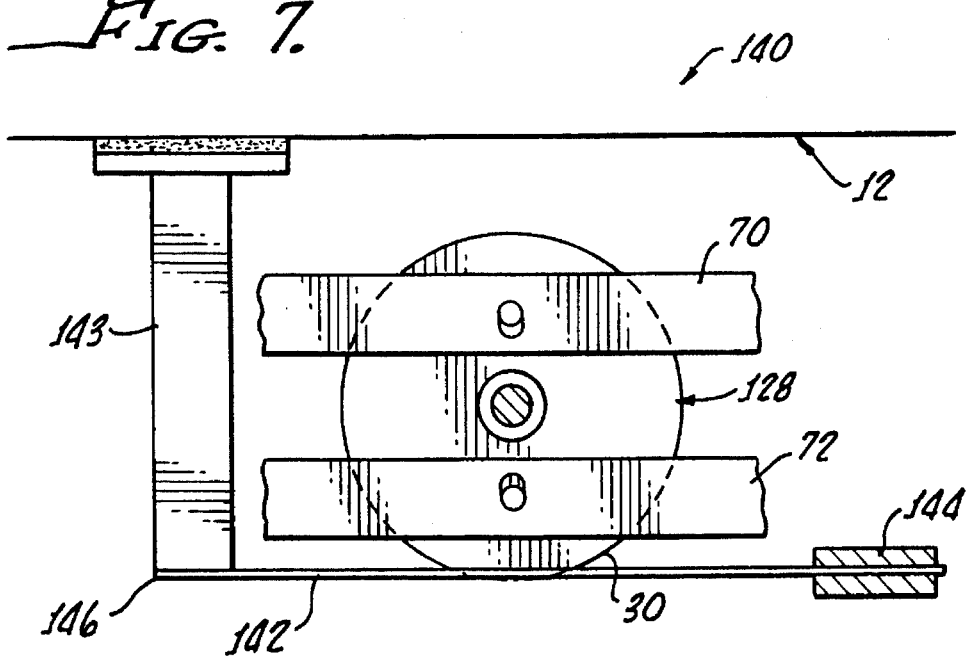

FIG. 7 shows yet another embodiment 140 of the present invention in which a leaf spring 142 provides means for biasing the brake shoe 143 into engagement with the rail 12. The leaf spring 142 may be fixed to the brake housing (not shown) at one end of the spring 144 and may contact the brake shoe 143 at an opposite end 146. Similar to the embodiment shown in FIG. 6, axial movement of the member 128 will cause a cam surface 130 of the member to depress the leaf spring 142 and consequently cause the brake shoe 143 to disengage the rail 12.

It should be appreciated that the braking mechanism as hereinabove described may be utilized on an existing trolley system with simple modifications made thereto. For example, seaport cranes that are used to unload containers from freight ships commonly use festooned trolley systems that could substantially benefit from installation of a braking system made in accordance with the present invention. Each brake may be contained within a brake housing that is adapted to be bolted or otherwise secured to each existing trolley carrier body.

Although there has been hereinabove described a trolley system and brake system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A trolley system comprising;

a rail;

a tow trolley including means for supporting a load and means for movably attaching said tow trolley to said rail;

an end trolley fixed proximate one end of said rail and including means for supporting a load;

a plurality of intermediate trolleys disposed between said end trolley and said tow trolley, each intermediate trolley including means for movably attaching each intermediate trolley to said rail and means for supporting a load;

tow line means, interconnecting the end, intermediate and tow trolleys, for causing said tow trolley to move said intermediate trolleys apart from one another as the tow trolley moves along the rail away from the end trolley;

brake means, including an individual brake disposed on each of said intermediate trolleys, for preventing movement of each individual intermediate trolley along the rail;

means for releasing the individual brakes by pulling action of the tow line means when adjacent intermediate trolleys are spaced apart from one another at a distance proximately equal to a length of tow line means extending between the adjacent intermediate trolleys; and means for releasing the individual brakes upon impact of adjacent intermediate trolleys.

2. The trolley system according to claim 1 wherein each individual brake comprises a brake shoe operatively disposed for engagement with said rail, and bias means for urging said brake shoe into engagement with said rail.

3. The trolley system according to claim 2 wherein the means for releasing the individual brakes by pulling action comprises:

a member mounted for movement about an axis on a corresponding intermediate trolley;

means, connected to said tow line means, for causing said member to move;

means for driving said brake shoe in a direction away from said rail in response to movement of said member.

4. The trolley system according to claim 3 wherein said means for causing said member to move is comprised of first and second arms, both arms being pivotally mounted to said member.

5. The trolley system according to claim 4 wherein the means for releasing individual brakes upon impact comprises a bumper on the first arm.

6. The trolley system according to claim 5 wherein said means for driving said brake shoe in a direction away from said rail, includes a toothed perimeter of said member and a complementary toothed length of said brake shoe.

7. The trolley system according to claim 4 wherein said means comprises a spring.

8. The trolley system according to claim 7 wherein said spring is a leaf spring.

9. The trolley system according to claim 8 wherein said means for driving said brake shoe in a direction away from said rail comprises a cam surface of said member adapted to depress said leaf spring.

10. The trolley system according to claim 4 wherein said bias means comprises a pivoted lever including means for exerting a force on one end of said lever.

11. The trolley system according to claim 1 wherein the means for supporting a load of the tow trolley, intermediate trolleys and end trolley comprises saddle means for supporting at least one cable, said cable having a length greater than a length of said rail, and said cable being festooned between the tow trolley, intermediate trolleys and end trolley with a length between adjacent intermediate trolleys being longer than the length of tow line means extending between adjacent intermediate trolleys.

12. The trolley system according to claim 1 wherein the means for supporting a load of the tow trolley, intermediate trolley and end trolley comprises a cargo container suspended from each intermediate trolley.

13. A trolley system comprising;
   a rail;
   a tow trolley including means for supporting a load and means for movably attaching said tow trolley to said rail;
   an end trolley fixed proximate one end of said rail and including means for supporting a load;
   a plurality of intermediate trolleys disposed between said end trolley and said tow trolley, and each intermediate trolley including means for movably attaching each intermediate trolley to said rail and means for supporting a load;
   tow line means, interconnecting the end, intermediate and tow trolleys, for causing said tow trolley to move said intermediate trolleys apart from one another as the tow trolley moves along the rail away from the end trolley;
   brake means, including an individual brake disposed on each of said intermediate trolleys, for preventing movement of each individual intermediate trolley along the rail until release of a corresponding individual brake, said brake means including means for biasing each said individual brake into engagement with the rail;
   means for releasing the individual brakes by pulling action of the tow line means when adjacent intermediate trolleys are spaced apart from one another at a distance proximately equal to a length of tow line means extending between the adjacent intermediate trolleys; and
   means for releasing the individual brakes upon impact of adjacent intermediate trolleys.

14. The trolley system according to claim 13 wherein each said individual brake comprises a brake shoe operatively disposed for frictional engagement with said rail.

15. The trolley system according to claim 14 wherein the means for releasing the individual brakes by pulling action is comprised of:
   a member mounted for movement about an axis on a corresponding intermediate trolley;
   means, connected to said tow line means, for causing said member to move;
   means for driving said brake shoe in a direction away from said rail in response to movement of said member.

16. The trolley system according to claim 15 wherein the means for causing said member to move is comprised of first and second arms, both arms being pivotally mounted to said member.

17. The trolley system according to claim 16 wherein the means for releasing individual brakes upon impact comprises a bumper on the first arm.

18. The trolley system according to claim 13 wherein the means for biasing said individual brake comprises a spring.

19. The trolley system according to claim 18 wherein the spring is a leaf spring.

20. The trolley system according to claim 13 wherein the means for biasing comprises a pivoted lever With a weighted end.

21. The trolley system according to claim 13 wherein the means for supporting a load of the tow trolley, intermediate trolleys and end trolley comprises saddle means for supporting at least one cable, said cable having a length greater than a length of said rail, and said cable being festooned between the tow trolley, intermediate trolleys and end trolley with a length between adjacent intermediate trolleys being longer than the length of tow line means extending between adjacent intermediate trolleys.

22. The trolley system according to claim 13 wherein the means for supporting a load of the tow trolley, intermediate trolley and end trolley comprises a cargo container suspended from each intermediate trolley.

23. A brake system for a trolley system having a rail, a tow trolley, an end trolley, and intermediate trolleys interconnected with a tow line, said brake system comprising:
   brake means, including an individual brake disposed on each of said intermediate trolleys, for preventing movement of each individual intermediate trolley along the rail, said brake means including means for biasing each said individual brake into engagement with the rail;
   means for releasing the individual brakes by pulling action of the tow line when adjacent intermediate trolleys are spaced apart from one another at a distance proximately equal to a length of a portion of the tow line extending between the adjacent intermediate trolleys; and
   means for releasing the individual brakes upon impact of adjacent intermediate trolleys.

24. The brake system according to claim 23 wherein each individual brake comprises a brake shoe operatively disposed for frictional engagement with said rail.

25. The brake system according to claim 24 wherein the means for releasing the individual brakes by pulling action comprises:

a member mounted for movement about an axis on a corresponding intermediate trolley;

means, connected to said tow line, for causing said member to move;

means for driving said brake shoe in a direction away from said rail in response to movement of said member.

26. The brake system according to claim 25 wherein said means for causing said member to move is comprised of a first arm pivotally mounted to said member, and a second arm pivotally mounted to said member.

27. The brake system according to claim 26 wherein said means for releasing individual brakes upon impact comprises a bumper on each first arm.

28. The brake system according to claim 23 wherein the means for biasing comprises a spring.

29. The brake system according to claim 23 wherein the means for biasing comprises a pivoted lever including means for exerting a force on one end of said lever.

* * * * *